United States Patent [19]
Park

[11] 3,849,666
[45] Nov. 19, 1974

[54] METHOD FOR EMPLOYMENT OF FAST TURBINE VALVING

[75] Inventor: Robert H. Park, Brewster, Mass.

[73] Assignee: Fast Load Control, Inc., Brewster, Mass.

[22] Filed: Apr. 17, 1972

[21] Appl. No.: 244,594

Related U.S. Application Data

[63] Continuation-in-part of Ser. Nos. 525,615, Feb. 7, 1966, Pat. No. 3,515,893, and Ser. No. 42,281, June 1, 1970, Pat. No. 3,657,552.

[52] U.S. Cl.................... 307/85, 307/52, 307/57, 290/40
[51] Int. Cl............................................. H02j 1/10
[58] Field of Search............ 307/52, 57, 85, 86, 87, 307/93, 94; 290/40

[56] References Cited
UNITED STATES PATENTS
3,051,883  8/1962  Smith................................. 307/52

Primary Examiner—Herman J. Hohauser

[57] ABSTRACT

In a process of fast steam turbine valving employed as a way to avoid loss of synchronism within a power system in the event of a transmission line fault, automatic modification of post fault sustained turbine driving power is initiated in response to operation of generating station line fault responsive protective relay means employed to initiate opening of transmission voltage level circuit breakers, when the fault location and circuit arrangement is such that the opening of one or more back-up circuit breakers resulting from delay in fault clearance would cause the opening of two transmission lines, and provision is made to cancel the modification signal if back-up breaker operation does not take place within a preset time interval.

2 Claims, 3 Drawing Figures

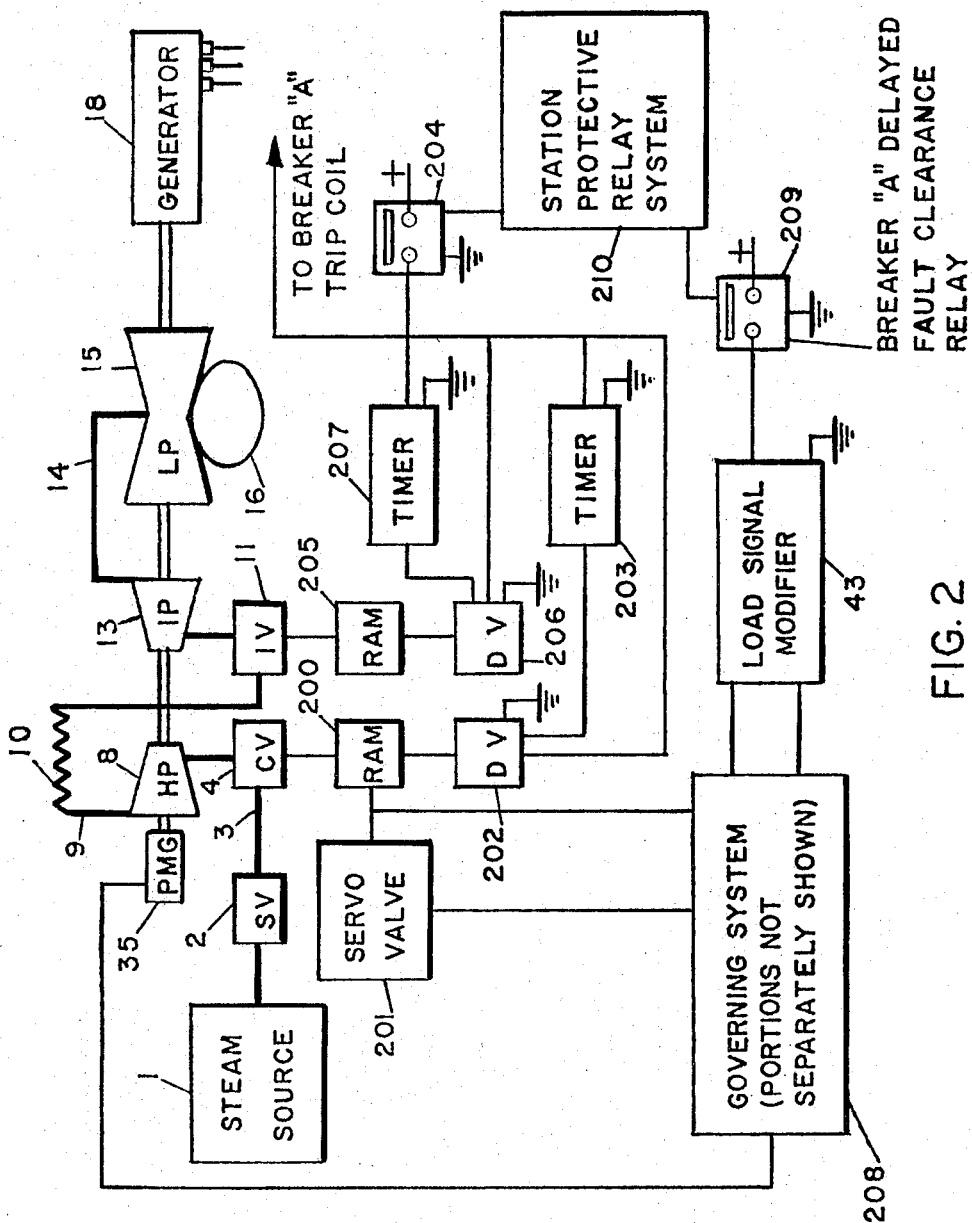
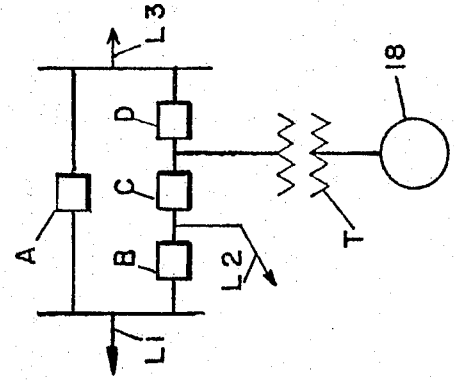
FIG. 2
FIG. 1

METHOD FOR EMPLOYMENT OF FAST TURBINE VALVING

CROSS REFERENCE TO RELATED INVENTIONS

This patent application is a continuation-in-part application Ser. No. 525,615 filed Feb. 7, 1966 now U.S. Pat. No. 3,515,893 and application Ser. No. 42,281 filed June 1, 1970 which issued on Apr. 18, 1972 as U.S. Pat. No. 3,657,552.

My invention relates in its principal aspect to means for rapidly controlling power flow within power transmission elements of interconnected power systems with a view to favorably affecting the stability of such systems when jeopardized by suddenly occurring adverse events.

BACKGROUND OF THE INVENTION

1. Field of Invention

The area of utility of the invention comprises prevention of development of system instability within power systems when threatened by transmission line faults.

The area of method comprises employment of means of automatic full or partial closure of valves controlling input of steam to steam turbine type generator prime movers of power systems, effected within one-fourth second following a fault, followed by full or partial valve reopening, effected within a matter of seconds.

2. Prior Art

Early patents that are of interest as in the nature of prior art comprise U.S. Pat. Nos. 1,705,688 and 1,935,292 which issued respectively to S. A. Staege on Mar. 19, 1929, and to S. B. Griscom et al. on Nov. 14, 1933.

Tests reported in reference (6) and carried out in 1930, on a 50,000 k.w. reheat type turbine generator, showed that useful results could be obtained if sufficiently fast valve closure was achieved with the aid of valve operating oil dumping.

In 1966 a technical paper was presented before The American Power Conference which reviewed potentialities of rapidly executed valve closing as a system stability improving measure. (2)*

*numbers in parentheses refer to a table of references located toward the end of the specification.

Following this paper, computer implemented studies were carried out which indicated that what was termed either "early valving," or "Fast valving" could significantly improve stability (c.f. references 1b, 2, 3, 4, 5), and these and other studies, in turn, led to the placement of orders for the furnishing of steam-electric generating units that would be suitable equipped to allow employment of rapid valving as a stability benefiting means.

In the matter of controls, ability of manufactures to respond to customer interest was aided by the development of electro-hydraulic turbine control systems (1c, 1d) which included provision to rapidly discharge steam valve actuator oil, in response to operation of dump valves, as a way to avoid development of excessive turbine speed on loss of electrical load with fast response achieved by use of a fast acting power-load unbalance type relay responsive to the difference between turbine driving power and generator load, employed to control the operation of solenoid controlled trip valves that act to collapse dump valve pilot oil pressure, (c.f. refs. 1a-p43, 1c-pp 136–138, and 1d-pp 195–200).

To adapt this equipment to stability improvement, the procedure has been to provide so that a line fault would cause a turbine's intercepting valves (1a, 1b, 2, 4, 5), or both the intercepting and control valves (3) to close and after a period of the order of one second, reopen in response to the timed reclosure of dump valves.

My issued patents describe employment of rapidly executed changes in position of servo valves of turbine governing systems, executed independently of speed change as a way to achieve fast turbine full or partial closure and reopening.

Whereas this approach is workable if large enough servo valves are used, as already noted, it is also possible to employ dumping of oil from rams of steam valve actuators as a way to rapidly close such valves and since this has been the approach to fast valving that has been principally employed commercially to date the election was made to employ it in the embodiment described in the present disclosure.

Both my issued patents and my copending application give consideration to applications of fast valving that require sustained reduction of generator output following a line fault, and, with this need in mind, provide for sustained partial closure of turbine control valves following faults, with response dependent on prefault system conditions.

My copending application introduces the concept of effecting sustained partial valve closure when two of a group of three or more lines open in response to a fault.

The present application describes a control system which selectively rapidly initiates valve closing in advance of the opening of two lines when a fault occurs that would cause the opening of two lines if delay in fault clearance occurred.

It was an aspect of my issued patents that they described procedures for modification of fast valving programs in response to the occurrence of a refault on automatic faulted line circuit breaker reclosure. The present application responds to the post fault event of delay in fault clearance by modifying the fast valving program that would otherwise apply.

SUMMARY OF THE INVENTION

Briefly stated the invention has application in situations in which a generating station is united to a transmission network by at least three lines, and consists in, optionally electing either to, a. initiate fast steam turbine valving in response to any line fault which if delayed in clearance could cause the opening of two lines and b. respond to delay in fault clearance by initiating a change in the load reference signal of the governor of the turbine of such nature that the sustained value of turbine driving power following the fault will be lower than the prefault value, or to c. automatically initiate fast steam turbine valving in response to the occurrence of faults that would cause the opening of two lines if delay in fault clearance caused operation of a delayed fault clearance relay, d. simultaneously automatically initiate turbine governor load signal modification of a nature adapted to reduce sustained post fault turbine driving power, e. provide so as to cancel the load signal modification effected in step (b) if normal fault clearance takes place within a predetermined period of time following fault occurrence.

It is an object of the invention to employ sustained partial control valve closure type fast valving as a way of solving problems of transient and/or steady state stability such as arise when a line fault causes the opening of two out of a total of three or more lines that provide parallel paths of power flow from a power station to a power transmission network.

Another object of the invention is to employ sustained partial control valve closure type fast valving as a way to preserve system stability when endangered by delay in clearance of a transmission line fault.

Another object is to avoid such employment in cases that would not cause the opening of two lines.

BRIEF DESCRIPTION OF THE DRAWINGS

FIG. 1 is a diagram of a power station high voltage bus.

FIG. 2 is a view of a steam turbine and turbine control system that is adapted to effect rapid turbine driving power changes as a way to improve system stability.

DETAILED DESCRIPTION OF THE INVENTION

Figure 4:
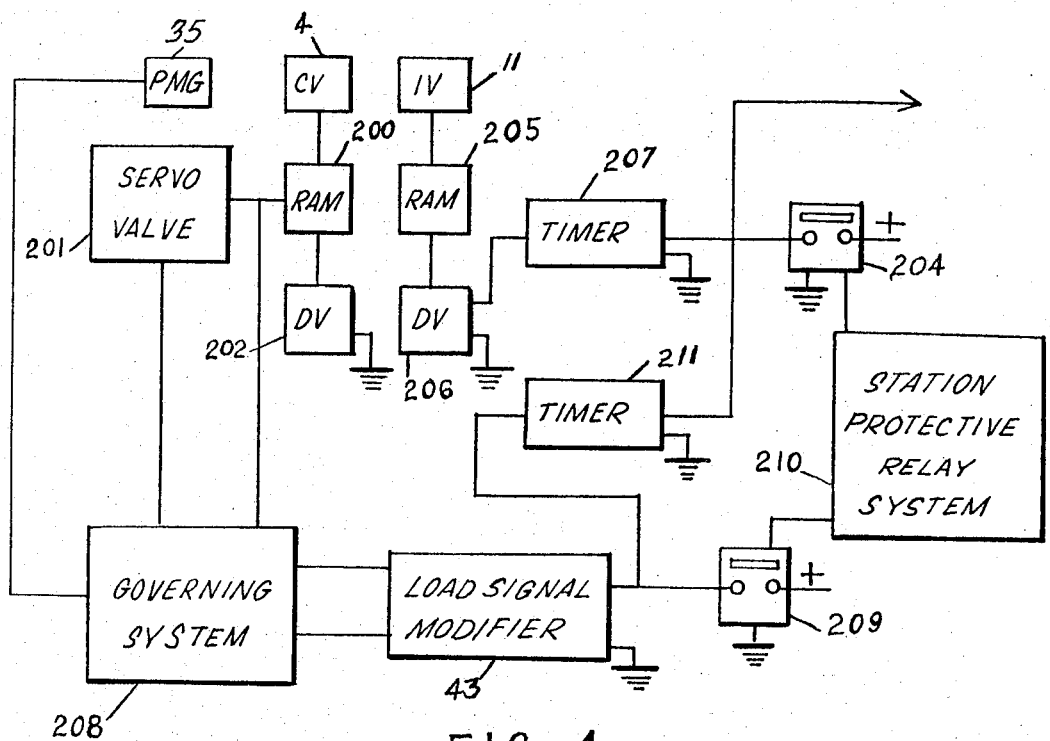
FIG. 4 is a modification of FIG. 3.

FIG. 1 comprises a diagram of a ring type high voltage bus of a generating station which incorporates a single generator.

Transmission lines L1, L2, and L3 are to be understood as making connections to a transmission network of a power system or power system interconnection.

The generating station's protective relay system will operate to open breakers A and B if a fault occurs on line L1.

If there is delay in the opening of breaker A the back-up protection system will open breaker D with the effect that lines L1 and L3 will open, and in the several possible cases results will be as in table I below.

Fast valve closing with employment of sustained partial control valve closure could be needed when due to delay in the opening of breaker A lines L1 and L3 are lost, but might not be needed when due to delay in the opening of breaker B lines L1 and L2 are lost, or vice versa, or might be required in both of these cases.

Again fast valve closing not employing sustained partial control valve closure might suffice in one case but might not suffice in another.

The invention is concerned with cases where fast valving plus sustained partial control valve closure is needed in the case of delay in fault clearance and not needed, or needed in less degree, if there is no delay.

Power system planners are able to predict what will take place in any specific case through employment of computer implemented calculations, and thereby identify which conditions are critical.

To illustrate the invention it will be assumed that a fault on either line L1 or line L3 requires fast valving including use of sustained partial control valve closure when, but only when, delay in fault clearance causes the opening of both lines.

Whether or not fast valving would be needed if only the faulted line opened it will be desirable to immediately apply it for a fault on either line in order to avoid delay in application, which if not provided against would impair ability to handle the stability problem that develops if two lines open.

On the other hand it will usually be advantageous to avoid unnecessary use of sustained partial control valve closure.

Achievement of selective application of partial control valve closure can be accomplished by providing so as to rapidly apply a suitable bias to the load reference setting of the turbines governing system when there is evidence of delay in the opening of breaker A.

Referring now to FIG. 2, wherein figures below 200 correspond to those of a U.S. Pat. No. 3,097,488 which describes an electro-hydraulic turbine control system, steam from steam source 1 can flow to control valves 4 through stop valve 2 and thence through high pressure turbine 8 and reheater 10, intercepting valve 11, intermediate pressure turbine 13, and low pressure turbine 15, to end up as water in condenser 16.

Oil operated ram actuator 200, which is spring loaded, controls the position of a disc or plug of control valve 4 subject to the operation of servo valve 201 and oil dump valve installation 202 which is subject to the control of relay 204 and timer 203, which could comprise a normally closed time delay opening relay. A similar type of ram actuator 205 determines the position of the disc of intercepting valve 11 subject to the control of oil dump valve 206 which is controlled by relay 204 and by timer 207 which also could comprise a normally closed time delay opening relay.

Governing system 208 controls servo valve 201 subject to a speed signal received from permanent magnet generator 35, and a feed back from ram 200, and is also influenced by load signal modifier 43 which activates on closure of relay 209.

Details as to how load signal modifier 43 could be constructed can be had by reference to U.S. Pat. No. 3,198,954.

Taking up now the case of a fault on lines 1 or 3, when such a fault occurs the station protective relay system 210 energizes relay 204 which both energizes Table I

| | | Breaker openings | | | | |
|---|---|---|---|---|---|---|
| case | line faulted | normal | delayed | back-up | lines lost | loss of generator |
| a | L1 | A&B | A | D | L1 + L3 | No |
| b | L1 | do. | B | C | L1 + L2 | do. |
| c | L2 | B&C | B | A | do. | do. |
| d | L2 | do. | C | D | L2 | Yes |
| e | L3 | D&A | D | C | L3 | do. |
| f | L3 | do. | A | B | L1 + L3 | No | breaker A trip coil and causes operation of solenoid valves within dump valve installations 202 and 206 which when activated initiate oil dumping and rapid closure of valves 4 and 11.

Timers 203 and 207 are energized and when timed out cause the dump valves to close whereupon oil reenters the rams and brings about a process of valve lifting which typically proceeds at a rate such that the control valve opens in a period of 5 seconds and the intercepting valves in a period of 5 to 10 seconds.

The rams will move full stroke downward in a small fraction of a second and thereby fully close the steam valves within say one-fourth second following a line fault that initiates control action. Readmission of oil may be advantageously started in say one-fourth to one-half second.

At a certain stage of control valve plug lift the oil supply to the control valve ram will begin to decrease due to the fact that the servo valve is approaching its closed position.

The control valve plug lift at which the servo valve acts to shut off oil flow is determined by the turbine control systems load and speed reference settings as obtaining prior to the fault and the influence of load signal modifier 43, and as well as by the further influence of tie line and economic control systems which however typically do not act rapidly.

When a fault occurs on lines L1 or L3 the station protective relay system 210 will cause relay 204 to close which in turn will initiate fast valving.

If now breaker A clears normally breaker A delayed fault clearance relay 209 remains open and as the rams refill with oil the servo valve will cause the control valve to be restored to its prefault position.

If however breaker A should fail to open when a fault occurs on either line L1 or line L3 relay 209 will close, typically after one-eighth to one-fourth second delay, and when this occurs load signal modifier 43 will modify the governors load reference signal to an extent determined by whatever load modification signal has been established in advance, and thereby cause the servo valve to shut off oil flow to ram 200 at a new value of ram stroke which in turn will cause the turbine to develop reduced driving power relative to prefault conditions, subject only to the action of tie line and economic controls, which if desired, can be rendered inactive.

It is thus possible to set into the turbine control system provision for reduced post fault turbine driving power relative to prefault value.

It is not necessary to employ an electro-hydraulic governing system and in this connection U.S. Pat. No. 3,198,954 and also my patent Re26,571 shows how a mechanical-hydraulic governor can be subject to fast modification of load reference whereby to effect a shift in a turbine's speed-load characteristic.

With use of two load signal modifiers one could be arranged to respond to a breaker A delayed fault clearance relay, and the other to a relay that would respond to delay in fault clearance operation of breaker B.

Provision could also be made to apply one value of load modification signal if breaker A opened normally and another if delay in fault clearance occurred.

Reference to FIG. 2 of U.S. Pat. No. 3,198,954 will reveal that in the case of electro-hydraulic-governors load signal modification can be accomplished merely by altering one of the voltage inputs to a control system. This implies that it is easy to make provision to vary the magnitude of the load modification signal as by a potentiometer that would be turned manually or manually controlled as to setting from a remote control station or by one or another automatic means.

With manual control a station operator could vary the magnitude of the load modification signal so as to take account of the influence of system load and factors such as lines or generators out of service and loadings of generators, and in doing so could be guided by information arrived at through system stability studies, and when conditions warranted could provide for a zero magnitude signal that would be without effect, and it should be regarded as an aspect of this invention that an operator could elect to employ manual control of load modification signal.

Extension to include response to a signal generator such as described in my copending application would represent a step that might not be accepted as merely involving the skill of any qualified control system engineer or technician, but can be dealt with in a further continuation-in-part of my copending application.

Convenient means of effecting load reference modification of mechanical-hydraulic governors can be had by minor modification of what is shown in my patent Re26,571 or by providing worm gear and motor means for rotating abutment member 34 of U.S. Pat. No. 3,198,954, or in other ways providing to vary the stroke of rod 31 of that patent.

Whereas FIG. 1 of the present application shows only three lines, a single generator, and a ring bus in which lines are separated by only one breaker, the invention has application regardless of the number of generators and line terminations, provided only that the bus arrangement is such that delay in fault clearance will cause the opening of two lines of a group of three or more that serve to tie the station to a transmission network of a system or power system interconnection, and in such event operate to weaken the connection of the station to the system or interconnection to a greater extent than would the loss of only one line.

If two breakers are used at each line termination, and all lines are separated by two breakers, as in what is termed a complete double bus, delay in fault clearance will not cause loss of two lines, but as this type of bus is expensive, various other arrangements are widely used and numerous important installations utilize bus arrangements for which faults on some lines will cause the opening of two lines if delay in fault clearance occurs.

In any case, where delay in fault clearance causes the opening of two lines, the present invention has a useful field of application when the opening of two lines will, or in at least some situations can cause system instability.

Whereas in FIG. 2 load signal modification was made responsive to breaker A delayed fault clearance relay 209, which has for its main function the tripping of the appropriate back-up breaker, i.e., either breaker B or breaker D, the purpose of the invention could also be served by alternate use of a circuit that, with employment of circuit breaker A and B auxiliary switches in series connection, and also breaker A and breaker D auxiliary switches in series connection, would respond to whether or not both breakers A and B, or A and D, had opened, and hence to whether both lines L1 and L3 had opened, rather than to whether a second breaker had been energized to open.

References cited in the text are listed below.

Table of References

1. IEEE Tutorial Course Text 70 M29 — PWR "The Role of Prime Movers in System Stability"
    a. D. J. Aanstad, Westinghouse "DYNAMIC RESPONSE AND DATA CONSTANTS FOR LARGE STEAM TURBINES" pp. 40–49
    b. R. T. Byerly, Westinghouse — "POWER SYSTEM STABILITY — EFFECTS OF CONTROL SYSTEM PERFORMANCE" pp. 57–65
    c. M. A. Eggenberger, General Electric Co. — "A SIMPLIFIED ANALYSIS OF THE NO-LOAD STABILITY OF MECHANICAL-HYDRAULIC SPEED CONTROL SYSTEMS FOR STEAM TURBINES" pp. 101–118 — "INTRODUCTION TO THE BASIC ELEMENTS OF CONTROL SYSTEMS FOR LARGE STEAM TURBINE-GENERATORS" pp. 119–141
    d. M. Birnbaum, and E. G. Noyes, Westinghouse — "ELECTRO-HYDRAULIC CONTROL FOR IMPROVED AVAILABILITY AND OPERATION OF LARGE STEAM TURBINES" pp. 193–200
2. F. P. deMello, D. N. Ewart, M. Temoshok, and M. A. Eggenberger — "TURBINE ENERGY CONTROLS AID IN POWER SYSTEM PERFORMANCE," Proc. Amer. Power Conference 1966, Vol. 28 pp. 438–445.
3. R. G. Farmer, R. H. Hartley, M. H. Kent, L. M. Wheeler — "FOUR CORNERS PROJECT STABILITY STUDIES" — IEEE Conference Paper — 68 CP 708-PWR
4. P. G. Brown, F. P. de Mello, E. H. Lenfest, R. J. Mills, "EFFECTS OF EXCITATION, TURBINE ENERGY CONTROL AND TRANSMISSION ON TRANSIENT STABILITY" IEEE Transactions Paper—70 TP 203-PWR—IEEE TRANSACTIONS VOL. PAS-89 No. 6 July/Aug. 1970 pp. 1247–1251
5. W. A. Morgan, H. B. Peck, D. R. Holland, F. A. Cullen, "MODERN STABILITY AIDS FOR CALVERT CLIFF UNITS," IEEE Transactions Paper — 70 TP 147-PWR
6. R. C. Buell, R. J. Caughey, E. M. Hunter, and V. M. Marquis — "GOVERNOR PERFORMANCE DURING SYSTEM DISTURBANCES" Trans. A.I.E.E. March 1931, vol. 50, page 354 et seq.

Figure 3:
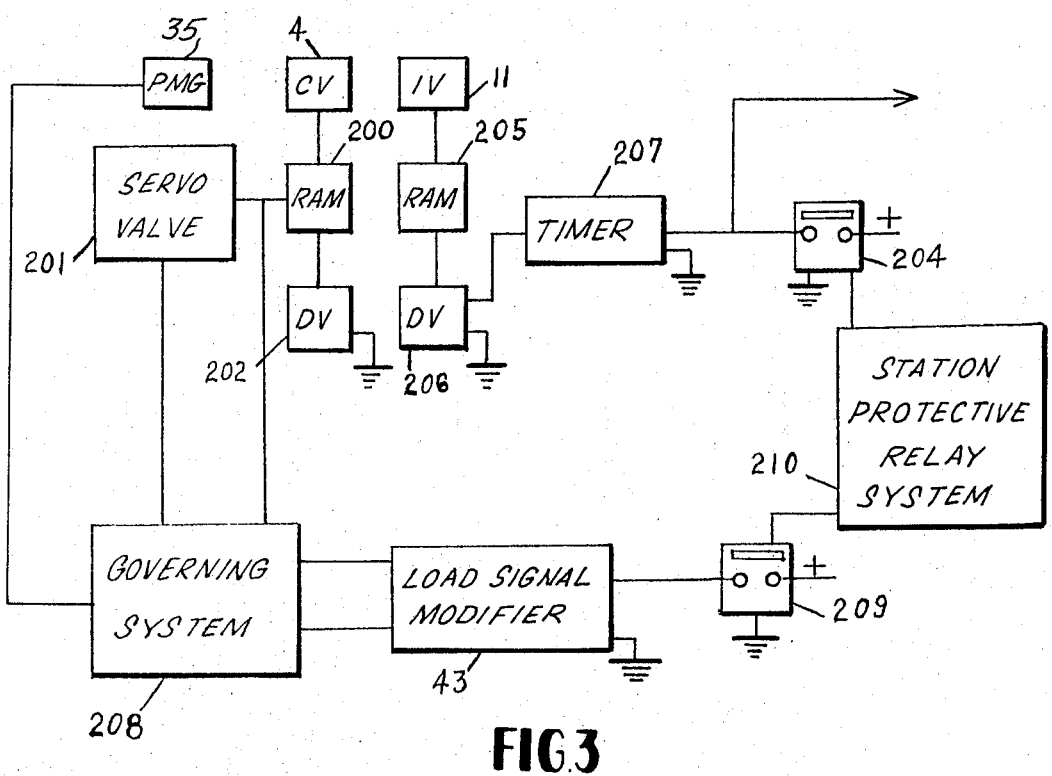
FIG. 3 is a partial view of a revised version of what is shown in FIG. 2.

With the arrangement shown in FIG. 2, in response to fault relaying of a type that acts to close the contacts of relay 204, control valves 4 and intercepting valves 11 will very rapidly fully close and thereafter almost at once start to reopen. However, the point applies that fast closure of control valves can cause lifting of high pressure safety valves, and where remedies are not easily at hand, as also in cases where there is little likelihood of need to bring into effect control valve closure as a way to achieve needed system stabilizing action, it can be desirable as shown in FIG. 3 to dispense with electrical connection between the output contact of relay 204 and the actuator of dump valve 202 with the effect that control valve position will remain unaffected by a fault until and unless load signal modification is caused by closure of the contacts of relay 209.

In an intermediate type of approach it can be arranged that some high pressure turbine steam inlet valves, which in practice can include turbine first stage by-pass as well as first stage steam control valves, would be arranged to rapidly fully close on a momentary basis in response to line fault relaying, while the remaining steam inlet valves would not be so controlled and hence would remain unaffected unless delay in fault clearance takes place, in which case operation of a delayed fault clearance relay would initiate partial closure of these valves via load signal modification, while also, normally, provision would also be made so that delay in fault clearance would modify the load signal of the high pressure inlet valves that had been rapidly fully closed whereby to limit the degree of reopening such that it will be less than prefault value.

Whereas in all of what has so far been described the approach has been to respond to line fault relaying by initiating fast momentary closure of intercepting valves followed by full reopening, and to rapidly fully close all or some control type valves, and thereafter reopen to prefault position, or to bring into effect a first type of load signal reduction, or to retain all or some control type valves in prefault position, and to additionally provide, in response to delay in fault clearance, so that the load signal of the valves would be further reduced, on a sustained basis by what will be here termed a second type program of load signal reduction, as a way to further limit degree of post fault turbine steam acceptance, it is equally feasible to accomplish the purpose of the invention by initiating the second type of load signal reduction in response to operation of a line fault relaying system relay such as relay 204 of FIG. 2 and to additionally provide so that the extent of signal reduction will revert to the first type unless delay in fault clearance is evidenced within a preset time period, as for example in a time period determined by closure of the contacts of a relay such as relay 209 which has been made responsive to such delay.

This last cited procedure moreover, can properly be viewed as offering advantage in that it acts to increase the degree of turbine driving power reduction that is accomplished during the period of the generator first swing and thereby is beneficial to system stability.

In relation to the foregoing, control valves that are not initially rapidly fully closed by actuator oil dumping can optionally be arranged to be initially subjected to a large load signal reduction with provision additionally made so that within a preset time period which ordinarily would be chosen not to exceed one or a few seconds, the magnitude of the load signal would be either fully or partly restored to prefault value, while also provision would be made to alter the load signal modification program in response to delay in fault clearance whereby to reduce extent of restoration of driving power when delay in fault clearance takes place, or, optionally, to increase it in the event of absence of delay in fault clearance.

In a versatile embodiment of this aspect of the present invention provision could be made so that the value of the load modification signal would be variably controlled according to a preset time pattern when a fault of critical type takes place, while it could be further arranged that this pattern would be modified in a predetermined way if there were delay as evidenced by failure of a relay such as relay 209 to close within a preset time.

Again the same type of load signal modification process could be made to depend on the operation of a relay that responded to the opening or to initiation of the opening of a pair of lines, whether or not due to delay in fault clearance.

FIG. 4 shows a partial view of the arrangement of FIG. 3 modified by inclusion of timer 211 which is to be understood to comprise a normally closed time delay open relay which is so timed that it will open after a delay period that exceeds the range of time delays that would ordinarily apply to operation of relay 209.

Evidently with the modification of FIG. 2 provided by FIG. 3 closure of relay 204 will initiate fast full intercepting valve closure followed promptly by initiation of the reopening phase of its close-reopen cycle and there will be no initiation of control valve closure unless and until relay 209 closes in response to delay in fault clearance with the concommitant effect of initiation of a preset load signal modification.

In contrast in the arrangement of FIG. 4 closure of relay 204 energizes normally closed time delay opening relay 211, which being closed, at once initiates load signal modification for a time period equal to the preset setting of the relay 211, while when this period has elapsed the load modification signal is cancelled, but only if relay 209 did not close during the delay period, in which case the load modification signal will be retained until such time as the contacts of relay 209 open. Provision is understood to be made so that relay 209 is of the lock-in type, with the effect that once closed it will remain so until reset manually, or by manually or otherwise initiated energization of a reset coil or other arrangement not shown in the drawings.

Equally fast simultaneous control valve closing followed by reopening, preferably under rapid stroke type servo control represents an option.

In the matter of claim terminology the term "fast turbine governor load signal modification" is to be interpreted as a change in turbine load reference accomplished in a small fraction of a second, as is feasible using what is shown in U.S. Pat. No. 3,198,954, and in practice, with an electro-hydraulic governor, is feasible in say one-sixtieth second.

The term "system conditions" is to mean station and line loadings, power output of generators, direction of power flow over lines, and lines and generators out of service.

The term "responding to delay in fault clearance" is to mean responding to operation of a relay, such as relay 209, that has been provided as part of a back-up protection scheme, or responding to some other effect of delay in fault clearance such as the fact that two lines opened.

What I claim is:

1. The method of avoiding development of instability within a power system as a consequence of a transmission line fault which comprises the steps of,
   a. automatically initiating fast steam turbine valving in response to the occurrence of faults that would cause the opening of two lines if delay in fault clearance caused operation of a delayed fault clearance relay,
   b. simultaneously automatically initiating turbine governor load signal modification of a nature adapted to reduce sustained post fault turbine driving power.
   c. cancelling the load signal modification effected in step (b) if normal fault clearance takes place within a predetermined period of time following fault occurrence.

2. The method of claim 1 supplemented by prefault manual adjustment of the magnitude of the load modification signal, whereby to take account of the influence of system conditions on the amount of signal needed to avoid loss of system stability.

* * * * *